US006768109B1

(12) United States Patent
Brokaw et al.

(10) Patent No.: US 6,768,109 B1
(45) Date of Patent: Jul. 27, 2004

(54) METHOD AND APPARATUS FOR MAGNETIC SEPARATION OF IONS

(75) Inventors: Charles E. Brokaw, Reno, NV (US); Thomas E. Brokaw, Aiken, SC (US)

(73) Assignee: 6×7 Visioneering, Inc., Reno, NV (US)

(*) Notice: Subject to any disclaimer, the term of this patent is extended or adjusted under 35 U.S.C. 154(b) by 0 days.

(21) Appl. No.: 10/254,011

(22) Filed: Sep. 20, 2002

Related U.S. Application Data

(60) Provisional application No. 60/324,236, filed on Sep. 21, 2001.

(51) Int. Cl.[7] .............................................. H01J 49/30
(52) U.S. Cl. ...................................... 250/298; 204/557
(58) Field of Search ................................ 250/281–283, 250/298; 313/359.1; 422/111; 204/451, 557, 601, 664

(56) References Cited

U.S. PATENT DOCUMENTS

| | | | |
|---|---|---|---|
| 549,765 A | 11/1895 | Calver | |
| 1,553,737 A | 9/1925 | Allingham | |
| 2,533,966 A | * 12/1950 | Simmons, Jr. | ............... 250/284 |
| 3,579,027 A | * 5/1971 | Pater | ...................... 315/111.41 |
| 4,019,868 A | 4/1977 | Sebacher et al. | ............. 23/281 |
| 4,067,702 A | * 1/1978 | Hickman | ........................ 95/31 |
| 4,233,127 A | 11/1980 | Monahan | ............. 204/157.1 R |
| 4,342,738 A | * 8/1982 | Burgund | .................. 204/157.5 |
| 4,405,594 A | 9/1983 | Pyle | ............................. 423/579 |
| 4,419,329 A | 12/1983 | Heller | ......................... 422/111 |
| 4,476,105 A | 10/1984 | Greenbaum | ............. 423/648 R |
| 5,658,448 A | 8/1997 | Lasich | ......................... 205/628 |
| 5,667,647 A | 9/1997 | Suga et al. | ................. 204/237 |
| 6,051,125 A | 4/2000 | Pham et al. | ................. 205/637 |

* cited by examiner

Primary Examiner—Nikita Wells
Assistant Examiner—Christopher M. Kalivoda
(74) Attorney, Agent, or Firm—Sierra Patent Group, Ltd.

(57) ABSTRACT

An apparatus for the separation of oppositely charged ions comprises a body including an inlet fluidly coupled to a first outlet and a second outlet. A flow director including a discharge is disposed in the body between the inlet and the first and second outlets. The flow director is configured to fluidly couple the inlet and the first and second outlets. The flow director discharge is proximate to the first and second outlets. A magnetic field is orthogonal to the flow director discharge and the magnetic field is located between the flow director and the first and second outlets. The magnetic field is configured to separate the oppositely charged ions.

17 Claims, 5 Drawing Sheets

FIG. 8
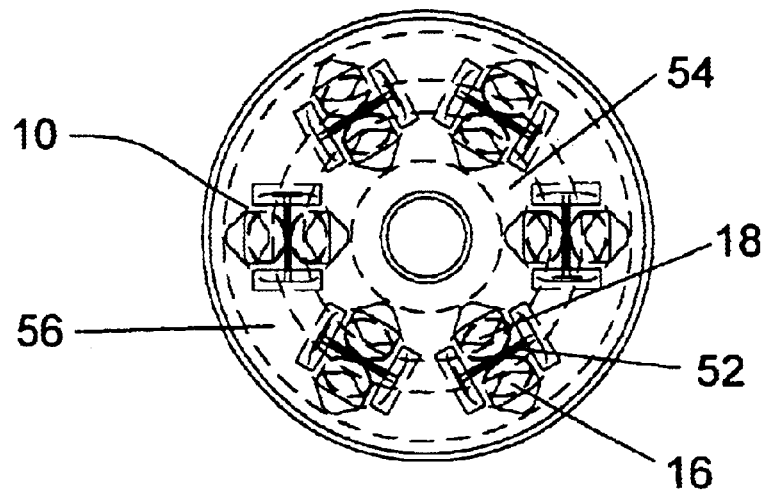
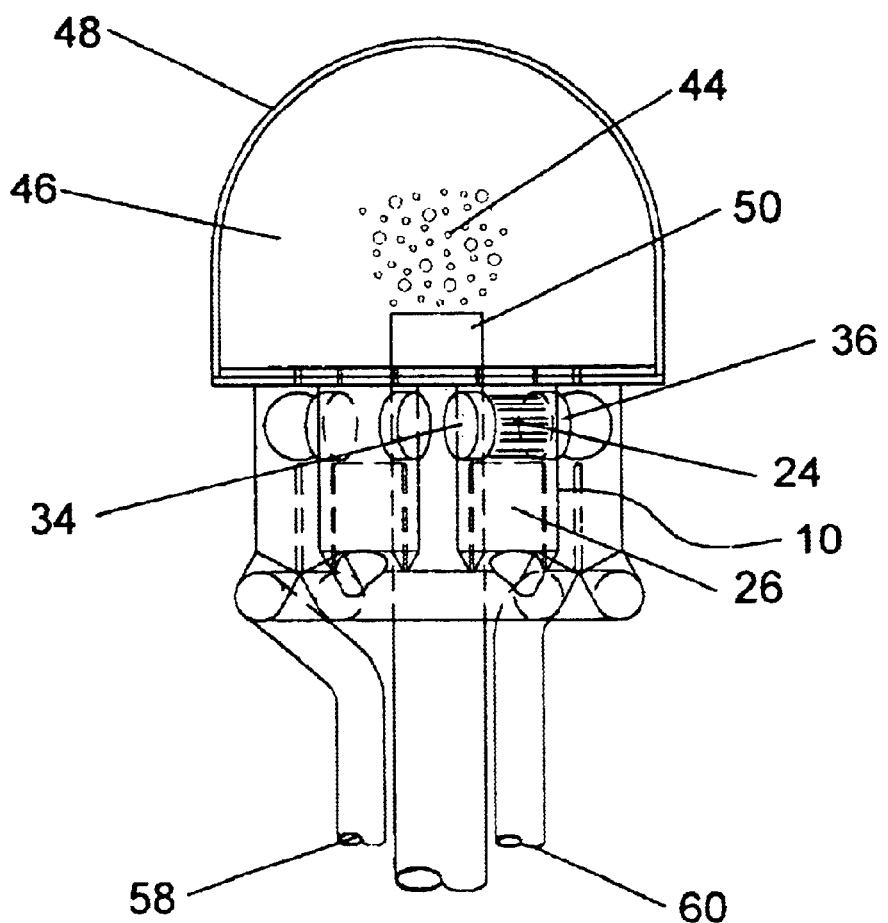
FIG. 7

METHOD AND APPARATUS FOR MAGNETIC SEPARATION OF IONS

CROSS REFERENCE TO RELATED APPLICATION

This application is a Utility application that claims priority to an earlier filed U.S. Provisional Application No. 60/324,236, filed Sep. 21, 2001, and expressly incorporates by reference the provisional application.

BACKGROUND

This disclosure pertains to a method of separating oppositely charged ions. Particularly, the disclosure pertains to a method of separating oppositely charged ions using magnetic fields, and more particularly to a method of separating oppositely charged ions in a high temperature environment. This disclosure also pertains to a method of separating thermally dissociated hydrogen and oxygen ions from high temperature dissociation of water using magnetic fields for the production of hydrogen and oxygen gas.

Prior art teaches the use of a parabolic dish to concentrate solar energy into a reaction chamber where water is injected and dissociated into its constituent parts due to the extreme temperatures achieved. While this method achieves efficient dissociation of the water molecule into its ionic constituents, it fails to address a satisfactory means of separating the ions after dissociation. Prior art methods exist for the separation of ionic components from a gaseous stream, the majority of which involve the use of a membrane to separate the ions based on their physical size or other physical characteristics. Membranes have many drawbacks, the most significant being the cost of the materials involved and the high frequency of membrane fouling.

SUMMARY

The disclosed device is directed toward an apparatus for the separation of ions. The apparatus for the separation of ions comprises a body including an inlet fluidly coupled to a first outlet and a second outlet. A flow director including a discharge is disposed in the body between the inlet and the first and second outlets. The flow director is configured to fluidly couple the inlet and the first and second outlets. The flow director discharge is proximate to the first and second outlets. A magnetic field is orthogonal to the flow director discharge and the magnetic field is located between the flow director and the first and second outlets.

The disclosed method is directed toward a method of separating ions. The method of separating ions comprises separating oppositely charged ions and directing the separated ions through a flow director. The method also includes flowing the separated ions through a magnetic field perpendicular to the magnetic field and dividing the separated ions based on ionic charge.

BRIEF DESCRIPTION OF THE DRAWING FIGURES

FIG. 7 is a side view of an exemplary embodiment of multiple ion separators in a solar application; and FIG. 8 is a top view of the exemplary embodiment of multiple ion separators in a solar application shown in FIG. 7.

DETAILED DESCRIPTION

Persons of ordinary skill in the art will realize that the following description of the present invention is illustrative only and not in any way limiting. Other embodiments of the invention will readily suggest themselves to such skilled persons having the benefit of this disclosure.

Figure 1:
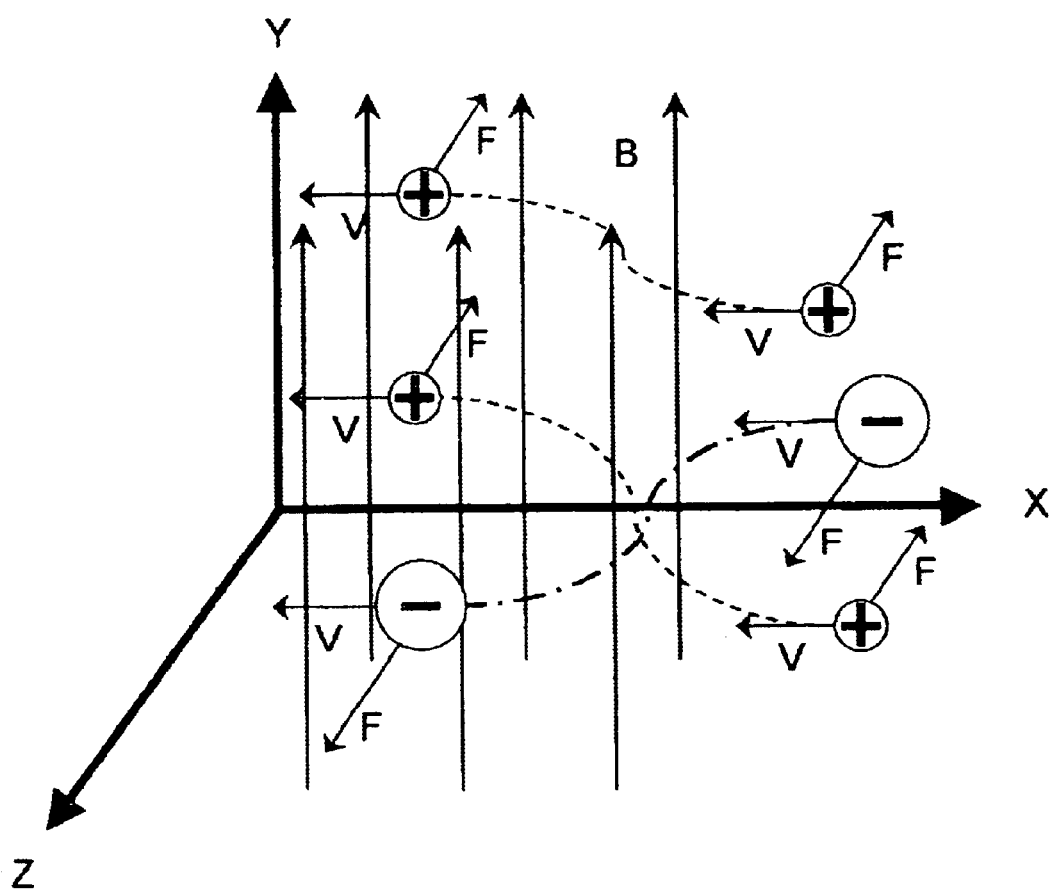
FIG. 1 is graphic schematic of the effects of a magnetic field on charged ions.

The apparatus and process separates any ions of opposing charge into distinct streams for collection. The method for achieving this separation is based on the fundamentals of magnetism and the forces that are generated on charged particles moving through a magnetic field. The force that is imparted on the particle by the field is perpendicular to both the direction of travel and the direction of the magnetic field lines. As illustrated in FIG. 1, particles of opposite charge that encounter the same field moving in the same direction will incur forces opposite one another. This is shown by the force vector (F) imparted on a particle moving with velocity vector (v) in a magnetic field (B). As the moving particle encounters this new force the direction of travel will be changed. The formula for calculating the force generated on charged particles moving in a magnetic field is:

$$F=(qv)(B)$$

Where: F is the generated force, q is the particle charge, v is the particle velocity and B is the magnitude of the magnetic field.

The equation formally shows that particles of opposite charge will experience opposing forces, and that the force due to the magnetic field is proportional to the velocity of the particle and the magnitude of the magnetic field. Therefore, a particle moving at a high velocity in a relatively small magnetic field will experience a great enough force to change its direction.

Figure 2:
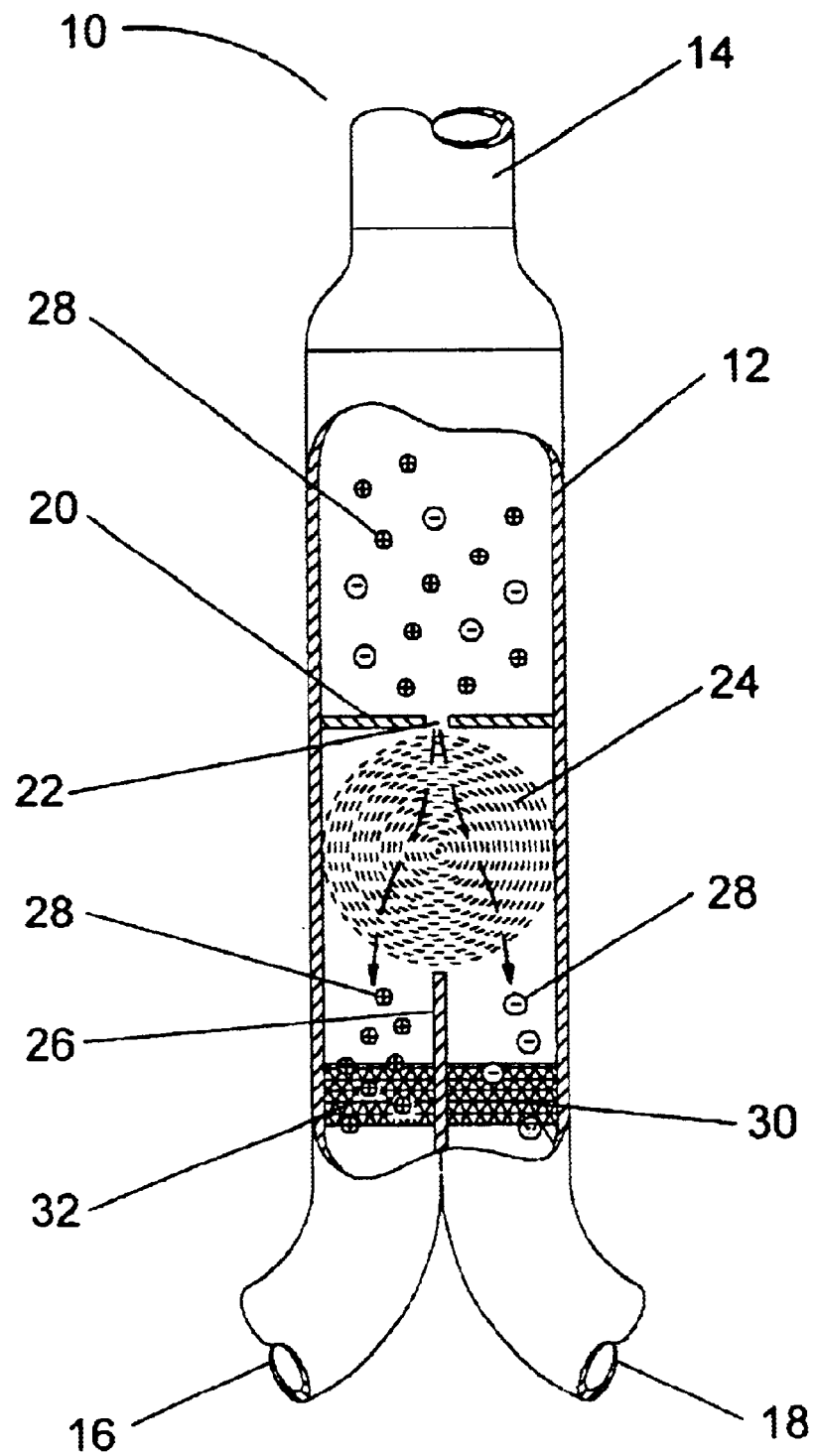
FIG. 2 is a schematic of an exemplary embodiment of an ion separator.

FIG. 2 illustrates an exemplary apparatus for magnetic separation of ions, or simply ion separator 10. The ion separator 10 includes a body 12. Fluid containing dissociated ions flows through the body 12. The body 12 can be a pipe shape in a preferred embodiment, as well as other shapes that provide both fluid flow and structural characteristics for handling high pressure hot fluids. The body 12 has an inlet 14 and at least one outlet 16 and preferably two outlets 16 and 18 and in other embodiments multiple outlets. The inlet 14 is fluidly coupled to the outlets 16 and 18. Fluidly coupled means to allow for fluid flow and fluid communication. A flow director 20 is disposed in the body 12 between the inlet 14 and the two outlets 16 and 18. The flow director 20 can be an orifice, a venturi, and the like. The flow director 20 includes a discharge 22. The flow director discharge 22 is located proximate to the outlets 16 and 18. A magnetic field 24, shown perpendicular to the drawing page, is established in the body 12 proximate to the discharge 22. The magnetic field 24 is orthogonal to the flow director 20. When a fluid flows through the body 12 and past the discharge 22, the magnetic field 24 will pass through the fluid flowing perpendicular to the direction of the fluid flow. The magnetic field 24 can be located between the flow director 20 and the outlets 16 and 18. A divider 26 is disposed in the body 12 proximate to the outlets 16 and 18. In an embodiment, the divider 26 located between the outlet 16 and the outlet 18 is configured to separate a high velocity stream of oppositely charged ions (simply ions) 28 flowing from the flow director 20 past the magnetic field 24 to the outlets 16 and 18. The oppositely charged ions 28 enter the body 12 through the inlet 14 and flow towards the flow director 20. The oppositely charged ions 28 enter the magnetic field 24 after passing through the flow director 20 and discharge 22 which focuses the stream into the center of the magnetic field 24 where a force is imparted on the ions 28 in a direction perpendicular to the magnetic field lines of the magnetic field 24 as well as perpendicular to the divider 26. The direction of the force is a function of the charge of the ion 28, which causes the ions 28 to separate and to flow toward the outlets 16 and 18 and to move to opposite sides of the divider 26. The ions 28 then pass through a stabilization grid 30 disposed in the body 12 proximate to the outlet 18 and a stabilization grid 32 disposed in the body 12 proximate to the outlet 16. In an embodiment, the stabilization grid 30 is disposed in the outlet 18 and the stabilization grid 32 is disposed in the outlet 16. The oppositely charged ions 28 exit the ion separator 10 through outlets 16 and 18 for collection and storage or consumption.

In a preferred embodiment, when used in conjunction with a solar heating source (not shown), the ion separator 10 can separate thermally dissociated hydrogen ions from the oxygen ions. The $H^+$ ions have no electron so they are positively charged. The $O^{2-}$ ions have two extra electrons, and therefore have a strong negative charge. The fact that the ions have opposing charges and will be moving in the same direction through the same magnetic field 24 provides the opposing forces necessary to achieve separation of the ions.

Figure 4:
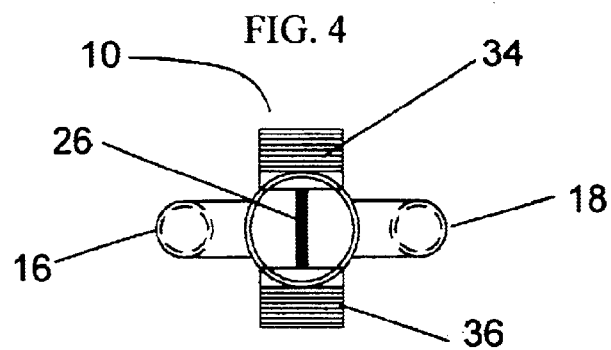
FIG. 4 is a top view of the exemplary embodiment of an ion separator.
Figure 3:
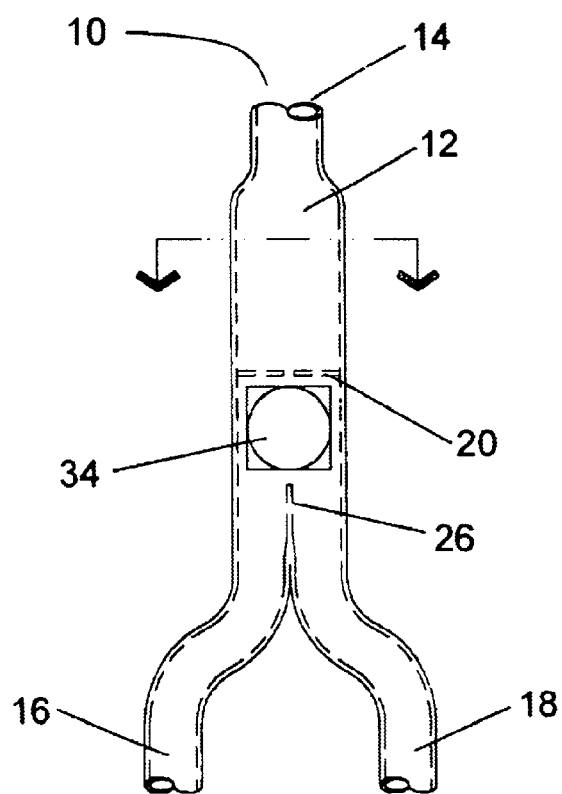
FIG. 3 is a front view of the exemplary embodiment of an ion separator.
Figure 5:
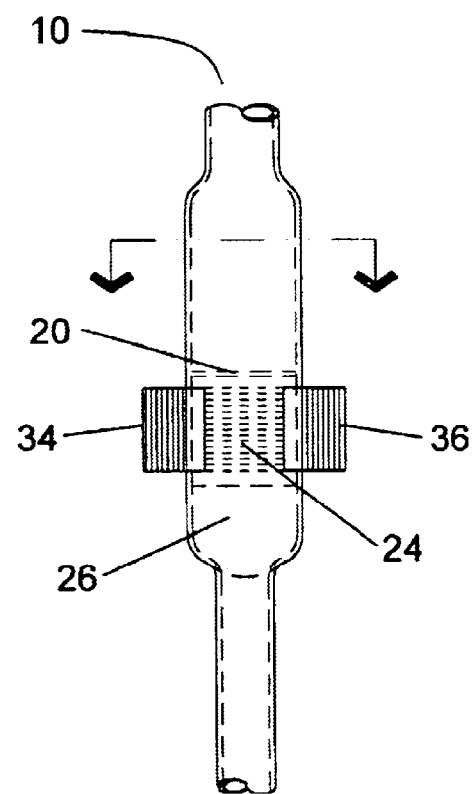
FIG. 5 is a side view of the exemplary embodiment of an ion separator.

Referring now to FIGS. 3, 4, and 5 front, top and side views of an exemplary ion separator 10 are illustrated. The ion separator 10 can include at least one magnet 34 and a plurality of magnets (i.e., two magnets 34 and 36). It is contemplated that the magnets 34 and 36 can be substituted with electric coils and the like, that generate the magnetic field 24 through the body 12. In one embodiment, the inlet 14 can be a pipe coupled to the body 12. The outlets 16 and 18 can also be pipe coupled to the body 12. One possible configuration of the ion separator 10 apparatus installed in a pipe and used to separate oppositely charged ions being transported in the pipe. Ions can enter the body 12 of the apparatus through inlet pipe 14. The ions can then pass through an orifice 20 and enter a magnetic field 24 generated by magnets 34 and 36. Divider 26 directs the separated ions into discharge pipes 16 and 18 for collection and storage or consumption.

Figure 6:
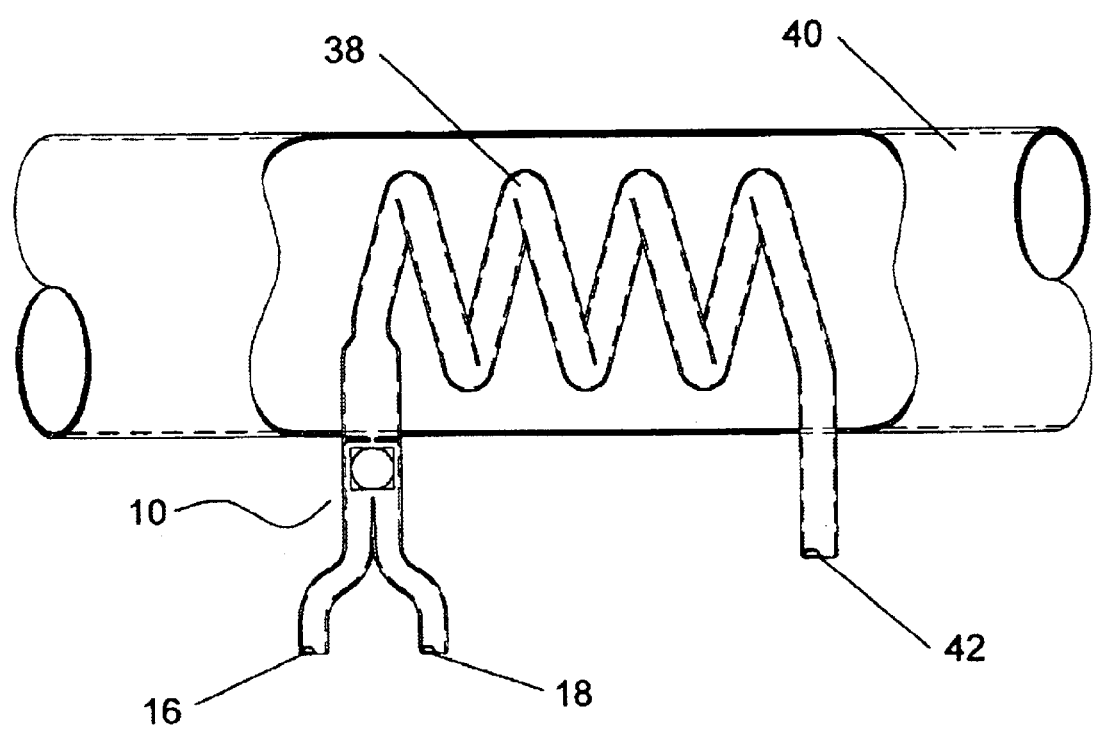
FIG. 6 is an exemplary embodiment of an ion separator with a waste heat exchanger.

FIG. 6 illustrates another embodiment of the ion separator 10 in a configuration of the ion separator apparatus 10, similar to the apparatus described in FIGS. 3, 4 and 5, with a heat exchanger 38 in a waste heat pipe 40. This device would be used for thermal dissociation of a fluid, such as water, into oppositely charged ions, such as $H^+$ and $O^-$, and separation of these into distinct streams. The fluid can enter heat exchanger 38 through pipe 42. Waste heat raises the temperature of the fluid in the heat exchanger 38, causing dissociation before the ions enter the ion separator 10. The separated ions are discharged through outlet pipes 16 and 18 for collection and storage or consumption.

FIGS. 7 and 8 illustrate a front view and top view, respectively, of another embodiment having a circular configuration of multiple ion separators 10 in a solar application. A gas stream 44, such as steam, enters a solar heating chamber 46 enclosed by a transparent housing 48 through supply pipe 50. A parabolic dish (not shown) focuses the sun's energy in chamber 46 through housing 48 proximate to a point just above the discharge of the supply pipe 50. Alternative means of focusing the sun's energy into heating chamber 46 can be employed. The gas stream 44 is dissociated by the sun's energy focused inside the solar heating chamber 46. The dissociated ions exit the solar heating chamber 46 through the orifices 52. The dissociated ions enter the ion separators 10. Appropriate magnetic fields 24 are created in the ion separators by magnets 34 and 36. Divider 26 directs the separated streams to outlet pipes 16 and 18. Collection headers 54 and 56 direct the gas streams to outlet pipes 58 and 60 for collection and storage or consumption. While the embodiment illustrated is a circular configuration of six ion separators 10, it should be noted that the actual configuration and number of ion separators 10 can be changed to suit the intended application.

The apparatus is comprised of a heating chamber, a flow divider (orifice), a separation chamber, and a means for electron stabilization. The process of using the apparatus is as follows. The orifice directs the dissociated ions from the heating chamber through a magnetic field created in the separation chamber. The orifice and the magnets are arranged so that the ions are moving perpendicular to the magnetic field when they encounter the magnetic field. Since both positive and negative ions are traveling in the same direction when they encounter the magnetic field, they will be deflected in opposite directions. The ions move at a high velocity due to the elevated temperature and pressure differentials of the system. Therefore, a small magnetic field produces a large enough magnetic force to deflect the ions in opposite directions. This phenomenon forces the separated ions into different collection tubes and is the basis for the ion separation process. Once separated, the ions encounter a means for electron stabilization where the now separate gasses will be stabilized.

The method and apparatus are applicable to any process that requires the separation of ions with opposing electrical charges. The primary benefit to be derived is in the field of solar-powered hydrogen production, where water is thermally dissociated by solar energy into hydrogen and oxygen ions that are then separated and collected for use as fuel. The method and apparatus are used in conjunction with a solar water heater as a means of dissociating water into $H^+$ and $O^-$ ions. The method and apparatus is a simpler, less expensive, and more efficient means of separating the dissociated ions. The method and apparatus are improvements on the prior art because they specify a more efficient separation method. When used in conjunction with a solar water heater the apparatus can generate an inexpensive stream of hydrogen. This is an improvement over the prior art due to the low cost of both operation and materials required to achieve the ionic separation. Once separated, the hydrogen and oxygen ions can be stabilized as $H_2$ and $O_2$ gas and can be collected and for storage and/or consumption. The method and apparatus are improvements on the prior art because they specify a more efficient separation method.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus for the separation of oppositely charged ions comprising:

a body including an inlet fluidly coupled to a first outlet and a second outlet;

a flow director including a discharge, said flow director disposed in said body between said inlet and said first and second outlets, said flow director configured to fluidly couple said inlet and said first and second outlets, said flow director discharge being proximate to said first and second outlets; and a magnetic field orthogonal to said flow director discharge, said magnetic field located between said flow director and said first and second outlets, said magnetic field configured to separate the oppositely charged ions.

2. The apparatus for the separation of ions of claim 1 further comprising:

a divider disposed in said body between said first outlet and said second outlet.

3. The apparatus for the separation of ions of claim 1 further comprising:

a first stabilization grid disposed in said first outlet and a second stabilization grid disposed in said second outlet.

4. The apparatus for the separation of ions of claim 1 wherein said flow director is configured to direct dissociated ions through said magnetic field, and said magnetic field is configured to impart a force on said ions in a direction perpendicular to said magnetic field for separating said oppositely charged ions.

5. The apparatus for the separation of ions of claim 4 wherein said dissociated ions include positively charged ions and negatively charged ions.

6. The apparatus for the separation of ions of claim 5, wherein said first outlet is configured to discharge said positively charged ions and said second outlet is configured to discharge said negatively charged ions.

7. The apparatus for the separation of ions of claim 5 wherein a first stabilization grid is configured to stabilize said positively charged ions and a second stabilization grid is configured to stabilize said negatively charged ions.

8. The apparatus for the separation of ions of claim 6 wherein said positively charged ions are hydrogen ions and said negatively charged ions are oxygen ions.

9. The apparatus for the separation of ions of claim 1 further comprising a magnet configured to generate said magnetic field.

10. A method of separating oppositely charged ions comprising:

flowing said oppositely charged ions;

directing said oppositely charged ions through a flow director;

flowing said oppositely charged ions through a magnetic field, said flow being perpendicular to said magnetic field;

separating said oppositely charged ions based on ionic charge;

flowing positive charged ions through a first outlet and flowing negative charged ions through a second outlet.

11. The method of claim 10 further comprising;

stabilizing said divided ions.

12. The method of claim 10 wherein said separating oppositely charged ions comprises dissociating molecules into negatively charged ions and positively charged ions.

13. The method of claim 12, wherein said dissociating molecules includes heating water until said water molecules dissociate into said positively charged ions and said negatively charged ions.

14. The method of claim 10, wherein said dividing said separated ions based on ionic charge includes flowing said separated ions through said magnetic field resulting in said positively charged ions flowing through a first outlet and said negatively charged ions flowing through a second outlet.

15. The method of claim 10, wherein said separating ions utilizes thermal energy from a waste heat source.

16. The method of claim 10, wherein said separating ions utilizes thermal energy from the sun.

17. An apparatus for the separation of oppositely charged ions comprising:

a body including an inlet fluidly coupled to a first outlet and a second outlet;

a flow director, said flow director disposed in said body between said inlet and said first and second outlets, said flow director configured to fluidly couple said inlet and said first and second outlets and to direct the oppositely charged ions;

a magnetic field orthogonal to a flow director discharge, said magnetic field located between said flow director and said first and second outlets, said magnetic field configured to separate the oppositely charged ions; and a divider disposed in said body between said first outlet and said second outlet, said divider comprising a solid structure having a neutral polarity.

\* \* \* \* \*